(12) United States Patent
De' Longhi et al.

(10) Patent No.: US 11,300,312 B2
(45) Date of Patent: Apr. 12, 2022

(54) METHOD TO REGULATE A CONDITIONING APPARATUS

(71) Applicant: DE' LONGHI APPLIANCES S.R.L. CON UNICO SOCIO, Treviso (IT)

(72) Inventors: Giuseppe De' Longhi, Treviso (IT); Maddalena Renier, Roncade (IT); Francesca Prosperi, Codognè (IT); Roshanak Mirmiran, Treviso (IT)

(73) Assignee: DE' LONGHI APPLIANCES S.R.L. CON UNICO SOCIO, Treviso (IT)

( * ) Notice: Subject to any disclaimer, the term of this patent is extended or adjusted under 35 U.S.C. 154(b) by 0 days.

(21) Appl. No.: 16/636,326

(22) PCT Filed: Jul. 30, 2018

(86) PCT No.: PCT/IT2018/050143
§ 371 (c)(1),
(2) Date: Feb. 3, 2020

(87) PCT Pub. No.: WO2019/026094
PCT Pub. Date: Feb. 7, 2019

(65) Prior Publication Data
US 2021/0180826 A1 Jun. 17, 2021

(30) Foreign Application Priority Data

Aug. 1, 2017 (IT) .................. 102017000088696

(51) Int. Cl.
*F24F 11/00* (2018.01)
*F24F 11/76* (2018.01)
(Continued)

(52) U.S. Cl.
CPC .............. *F24F 11/76* (2018.01); *F24F 11/77* (2018.01); *F24H 3/0411* (2013.01);
(Continued)

(58) Field of Classification Search
CPC .............. F25B 2500/26; F25B 2600/11; F25B 2700/2104; F24F 11/76; F24F 11/77; F24F 2110/10; F24F 2110/30
See application file for complete search history.

(56) References Cited

U.S. PATENT DOCUMENTS 3,668,883 A * 6/1972 Ruff .......................... F25B 1/10
62/158
4,873,649 A 10/1989 Grald et al.
(Continued)

FOREIGN PATENT DOCUMENTS

CN 105222264 A 1/2016

OTHER PUBLICATIONS

International Search Report and Written Opinion for PCT/IT2018/050143, dated Oct. 1, 2018.

*Primary Examiner* — Jonathan Bradford
(74) *Attorney, Agent, or Firm* — Marshall, Gerstein & Borun LLP

(57) ABSTRACT

A method for regulating a conditioning apparatus includes a heating/cooling device and a ventilation device which generates a flow of air toward the heating/cooling device in order to direct it toward a room to be conditioned. The method includes the step of switching on the conditioning apparatus in a switch-on instant, the step of activating the heating/cooling device and the ventilation device, the step of determining a commutation instant, and the step of driving the ventilation device so that, until the previously determined commutation instant, the ventilation device is stationary or rotates at a maximum speed equal to a certain speed of the ventilation device.

11 Claims, 1 Drawing Sheet

(51) Int. Cl.
*F24F 11/77* (2018.01)
*F24H 3/04* (2022.01)
*F24H 9/20* (2022.01)
*F25B 1/00* (2006.01)
*F24F 110/30* (2018.01)
*F24F 110/10* (2018.01)

(52) U.S. Cl.
CPC ............ *F24H 9/2071* (2013.01); *F25B 1/00* (2013.01); *F24F 2110/10* (2018.01); *F24F 2110/30* (2018.01); *F25B 2600/11* (2013.01); *F25B 2700/2104* (2013.01)

(56) References Cited

U.S. PATENT DOCUMENTS

| 5,533,352 | A | 7/1996 | Bahel et al. | |
|---|---|---|---|---|
| 2006/0096306 | A1* | 5/2006 | Okaza | F25B 13/00 62/228.1 |
| 2012/0023989 | A1* | 2/2012 | Kinoshita | F24F 11/70 62/186 |

* cited by examiner

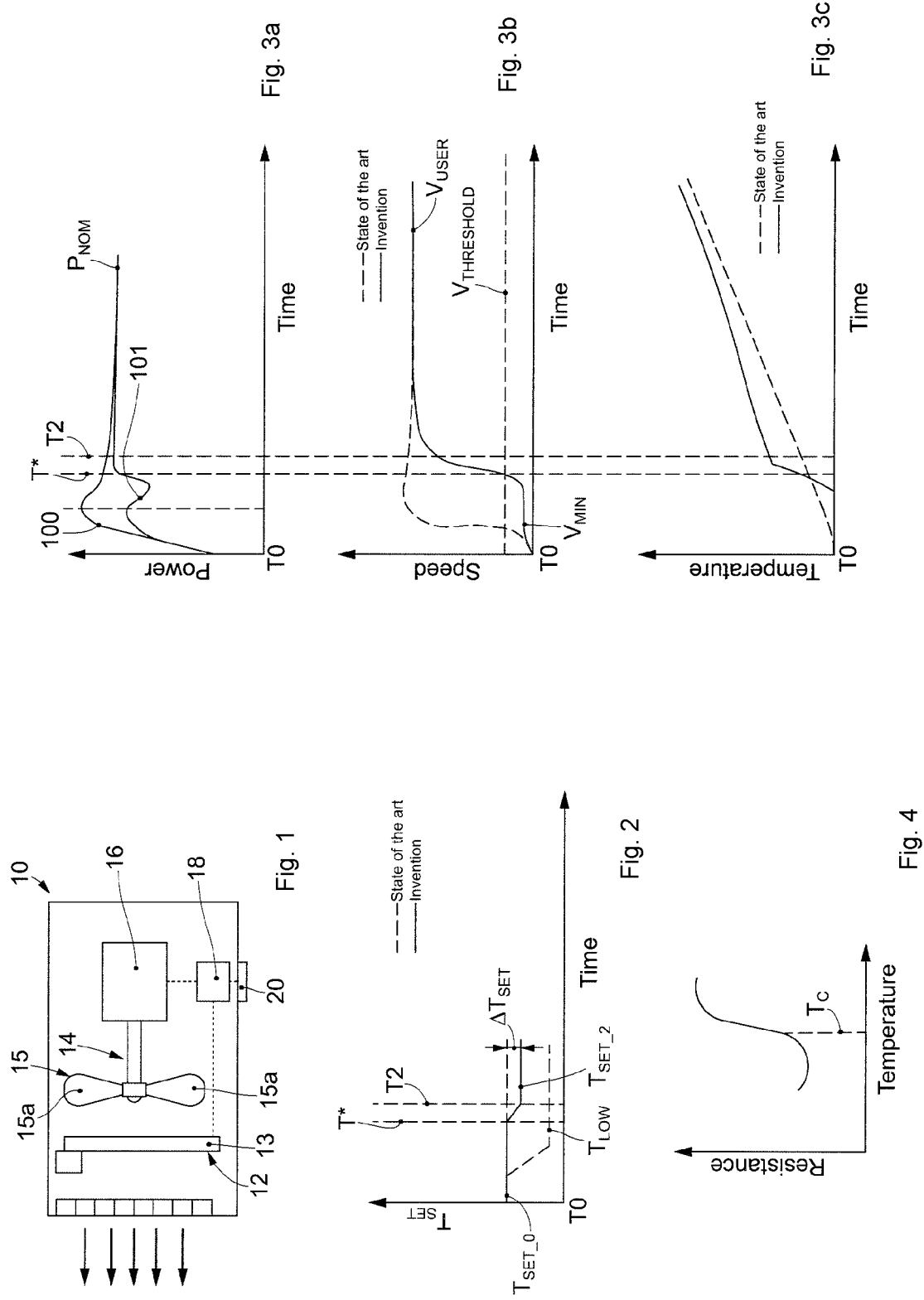

METHOD TO REGULATE A CONDITIONING APPARATUS

FIELD OF THE INVENTION

The present invention relates to a method to regulate an air conditioning apparatus, and in particular a method to regulate the start-up step of the air conditioning apparatus which creates an optimal sensation of comfort for a user.

BACKGROUND OF THE INVENTION

Air conditioning apparatuses regulate the temperature of the inside rooms of a building, or the inside of a vehicle.

Air conditioning apparatuses for a room can be portable, for example, so that they can be moved to a desired position, attached to the walls of a room, or integrated inside the walls.

In particular, air conditioning apparatuses are known which comprise a heating or cooling device and a fan that blows air toward the heating or cooling device, in order to heat or cool the room respectively.

In the start-up step, air conditioning apparatuses of the known type typically have the disadvantage that the fan begins operating at its nominal power from the moment it is switched on, directing the air toward the heating/cooling device, which, however, is not yet at the desired temperature. As a consequence, the flow of air generated by the fan and introduced into the room is not adequately conditioned until the heating/cooling device reaches the expected operating temperature.

This can cause an unpleasant sensation for the user, who is initially hit by a flow of air having a certain speed and a temperature substantially equal to the room temperature, which is therefore not comfortable for the user. The higher the delivery of air emitted by the conditioning apparatus, the more unpleasant the sensation is.

In recent years, manufacturers have increasingly sought to optimize the performance of air conditioning apparatuses, with the aim of generating a high degree of well-being or comfort for a user.

For example, air conditioning apparatuses are known which open the passage of air toward the room to be conditioned only after a certain time, when the air has already at least partly heated/cooled.

These apparatuses are not very efficient in the initial step in which, although fully functioning, the apparatuses consume energy to generate a flow of air which, is not used for the purpose of conditioning the room. Moreover, these apparatuses are complex since they require an alternative path for the flow of air generated during the initial step so that the air does not reach the room to be conditioned or at least is not directly directed toward the user.

An example of an apparatus in which the flow of air emitted is correlated with the temperature of a refrigerant liquid is described, for example in U.S. Pat. No. 5,533,352.

In general, however, apparatuses known in the state of the art do not optimize the sensation of well-being, or comfort, for a user, as they do not allow an adequate monitoring of the actual temperature variation perceived by a user.

One purpose of the present invention is to provide a method to regulate an air conditioning apparatus that is better than the regulation methods of known apparatuses.

Another purpose of the present invention is to provide a method to regulate an air conditioning apparatus which modulates the initial transitory step of the apparatus, until the device has reached the ideal conditions of comfort desired by the user, and to prevent alterations to the initial thermal conditions perceived by the user.

The Applicant has devised, tested and manufactured the present invention to overcome the shortcomings of the state of the art and to obtain these and other purposes and advantages.

SUMMARY OF THE INVENTION

In accordance with the above purposes, a method is provided to regulate an air conditioning apparatus, in which the conditioning apparatus comprises at least a means for thermal conditioning and a ventilation device which generates a flow of air toward the thermal conditioning means in order to direct the air toward the room to be conditioned.

In some embodiments, the thermal conditioning means can comprise a heating device, or a cooling device, or both, possibly also integrated into a single device.

The conditioning apparatus according to the present invention, can be, by way of example, a fan, or a conditioner, for example of a domestic type, or a conditioning system integrated in a motor vehicle, in the cabin of a bridge crane or in another similar or comparable space to be conditioned.

The method according to the present invention regulates the start-up step of the conditioning apparatus to prevent, or at least limit, unpleasant thermal effects for the user in an initial transitory step.

According to some embodiments, the method according to the present invention comprises the step of switching on the air conditioning apparatus in a switch-on instant, the step of calculating an "initial equivalent temperature" value which is representative of the thermal conditions of the room at the switch-on instant, the step of activating the thermal conditioning means, and the step of activating the ventilation device.

The equivalent temperature, as will be explained, r is an equivalent temperature of the air in an isothermal room at 50% relative humidity, in which an individual wearing standard clothing for the activity he/she is performing has the same thermal stress (understood as skin temperature) and the same thermoregulation capacity (understood as skin dampness) as the real room.

In other words, the equivalent temperature is a parameter that combines the conditions of a real room and the psychophysical conditions of an individual by describing a fictitious standard room in which the individual's response in terms of thermal comfort is known.

The method according to the invention also determines a commutation instant of the ventilation device, subsequent to the switch-on instant, such that an equivalent temperature as defined above, calculated in said commutation instant, is substantially equal or in any case as near as possible to the initial equivalent temperature calculated at the switch-on instant.

The equivalent temperature is characterized and influenced by of the combinations of air speed and temperature values; the variation of said equivalent temperature, for example, as determined by regulating the fan speed and possibly also of the heating/cooling element, can be controlled by acting on the regulation parameters of the air conditioning apparatus.

According to some embodiments, the method determines a commutation instant in which the speed of the ventilation device, combined with the temperature values of the heating/cooling device, is such that the equivalent temperature value at that instant is substantially equal to the initial equivalent temperature value.

The method according to the invention also provides that, until the commutation instant, the ventilation device is kept stationary, or rotates at a minimum speed, which is lower than the speed of the ventilation device determined for the commutation instant.

In this way, the speed of the fan increases when the heating/cooling element has reached a temperature condition such that the user is hit by a conditioned flow of air having the desired characteristics of comfort.

According to some embodiments, the thermal conditioning means comprise a resistive element.

According to some embodiments, the thermal conditioning means comprise a resistance of the PTC type (Positive Temperature Coefficient). In these embodiments, the commutation instant is subsequent to an instant in which the material of which the thermal conditioning means are made reaches its Curie temperature.

BRIEF DESCRIPTION OF THE DRAWINGS

These and other characteristics of the present invention will become apparent from the following description of some embodiments, given as a non-restrictive example with reference to the attached drawings wherein:

FIG. 1 is a schematic view of an example of an apparatus in which the method according to the present invention can be implemented;

FIG. 2 is a graph that schematically shows a comparison of the development of the equivalent temperature perceived by a user in the state of the art and according to the method of the present invention;

FIG. 3a schematically shows two samples of characteristic developments of the power consumption of thermal conditioning means comprised in an air conditioning apparatus according to the invention;

FIGS. 3b and 3c schematically show a comparison of the development over time of the speed and temperature of a flow of air exiting from the air conditioning apparatus to which the method according to the present invention can be applied;

FIG. 4 schematically shows an example of a characteristic development of the resistance as a function of the temperature of thermal conditioning means comprised in an air conditioning apparatus according to the invention.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Embodiments described here relate to a method to regulate an air conditioning apparatus 10 shown schematically in FIG. 1, and in particular a method that regulates the start-up step of the conditioning apparatus 10 in such a way as to prevent, or at least limit, any negative thermal effects perceived by a user.

According to some embodiments, the air conditioning apparatus 10 can be, by way of example, a conditioner, for example of the domestic type, which generates a flow of air toward a room to be conditioned, or a conditioning system integrated in a motor vehicle or a bridge crane, or similar or comparable means, which generates a flow of air toward the cabin.

The conditioning apparatus 10 can be the type suitable both for heating a room, typically when room temperatures are low, and for cooling a room, particularly when room temperatures are high.

The method of regulating an air conditioning apparatus 10 according to the invention can initially verify whether the apparatus is operating in heating mode to heat a room, or in cooling mode to cool a room.

In particular embodiments, the verification step controls the functioning settings that have been selected by the user.

In other embodiments, the step of verifying the mode in which the apparatus is operating can be implemented by temperature detection means, for example a temperature sensor of a known type.

We will now describe a method of regulating the air conditioning apparatus 10 when it is operating in heating mode to heat a room. It is obvious, however, that the method according to the invention can also be implemented, suitably adapted, when the conditioning apparatus 10 is operating in cooling mode.

The air conditioning apparatus 10 comprises at least one conditioning device 12, in particular in this embodiment configured as a heating device 12, and a ventilation device 14 which generates a flow of air through the heating device 12 to direct the air to the room to be conditioned.

The conditioning apparatus 10 can also comprise a cooling module of a known type, which will not be described here in detail since it is not important for the purposes of the present invention.

According to some embodiments, the heating device 12 can comprise a heating element of the resistive type.

According to other embodiments, the heating device 12 can comprise a thermistor, of a type known in the state of the art.

In particular embodiments, the heating device 12 can comprise a PTC thermistor ("Positive Temperature Coefficient"), known in the state of the art, which comprises a ceramic semiconductor which has a very high positive temperature coefficient.

PTC thermistors have a characteristic behavior in which resistance increases as the temperature of the thermistor itself increases, as can be seen in the graph in FIG. 4. In these known thermistors, as the temperature gradually increases and reaches the Curie temperature Tc of the material of which the thermistor is made, the resistance increases considerably and there is a parallel decrease in the current passing through it.

According to other embodiments, the ventilation device 14 comprises a ventilator, or fan, 15 provided with a plurality of blades 15a, and connected to a drive member 16 suitable to make the fan 15 rotate at the desired speed.

According to some embodiments, the conditioning apparatus 10 comprises a control and command unit 18, connected at least to the heating device 12 and to the ventilation device 14 and configured to control the functioning thereof.

The control unit 18 can be a computerized unit in which software can execute one or more specific programs which begin the regulation method, when applied to an air conditioning apparatus 10.

According to some embodiments, the air conditioning apparatus 10 comprises a user interface 20 by which a user can switch the air conditioning apparatus 10 on or off, and can possibly set the functioning parameters of the apparatus.

In particular embodiments, the user interface 20 allows the user to set both the desired temperature value, for example as expressed in centigrade or Fahrenheit degrees, and also an index indicative of the speed of the flow of air coming out of the apparatus, for example equal to "1", or "2", or "3", etc., to which increasing values of speed of the ventilation device 14 correspond.

According to some embodiments, the user interface 20 is operatively connected to the control and command unit 18 and communicates with the unit 18 to transfer to it the settings selected by the user.

The method according to the invention provides a conditioned flow of air having the characteristics of speed and temperature suitable to provide a sensation of comfort to the user, in particular preventing the user from perceiving sensations of discomfort due to flows of air with temperatures different from those desired.

The method according to the invention measures the user's sensation of comfort using the parameter of the perceived equivalent temperature, called SET (acronym for "Standard Effective Temperature").

The equivalent temperature $T_{SET}$ is defined as the equivalent temperature of the air in an isothermal room with 50% relative humidity, in which an individual wearing standard clothing for the activity he/she is performing has the same thermal stress (understood as the temperature of the skin) and the same thermoregulation capacity (understood as dampness of the skin) as the real room.

In other words, the equivalent temperature $T_{SET}$ is a parameter that combines the conditions of a real room and the psychophysical conditions of an individual, describing a fictitious standard room in which the individual's response in terms of thermal comfort is known.

The equivalent temperature $T_{SET}$, in its most extensive and complete form, can be calculated according to the following functional relationship:

$$T_{SET}=f(T,v,MRT,RH,clo,met)$$

where:
T is the temperature of the air in the room;
v is the speed of the air in the room;
MRT is the mean radiant temperature;
RH is relative humidity;
clo is a coefficient that expresses the thermal insulation of the individual, correlated to the garments he/she is wearing;
met is a coefficient that takes into account the individual's level of activity.

Within the field of the present invention, in the formula shown above, one or more of the parameters cited can be assumed as constant values, for example determined on the basis of the settings provided by the user, or on the basis of information supplied at the time of an initial setting of the air conditioning apparatus 10, or because it is presumed that they will remain so during the time interval considered.

According to some embodiments, the method determines the value of one or more of the parameters shown above, detecting the actual climatic conditions of the room to be conditioned by means of suitable detection devices.

For example one or more of the values of temperature, speed, relative humidity, mean radiant temperature, or other, can be detected directly by suitable sensors.

According to variant embodiments, one or more of the above values can be estimated or calculated on the basis of other measurements made; for example, the air speed can be estimated on the basis of the rotation speed of the ventilation device 14.

According to some embodiments, the coefficient clo can be assumed as equal to 1 if the individual is wearing typical winter indoor clothing, and instead equal to 0.5 if the individual is wearing typical summer indoor clothing.

According to some embodiments, the coefficient met can be assumed as equal to 1.2, that is, the coefficient associated with a sedentary type activity.

FIG. 2 shows the development over time of the equivalent temperature $T_{SET}$ in the initial switch-on step of an apparatus 10 starting from a switch-on instant t0 according to the state of the art (indicated by a line of dashes) and according to the present invention (indicated by a continuous line).

As can be seen, when a user switches on a conditioning apparatus of a known type, the development of the equivalent temperature $T_{SET}$ (indicated by a line of dashes) tends to decrease rapidly to a minimum level $T_{LOW}$.

The greater the difference between the initial equivalent temperature $T_{SET\_0}$, perceived by a user in correspondence with a switch-on instant t0 of the apparatus 10, and the minimum level $T_{LOW}$, the greater is the sensation of thermal discomfort perceived by the user.

On the contrary, the method according to the invention maintains the equivalent temperature $T_{SET}$ perceived at a level so as to prevent, or at least limit, a significant alteration of the thermal condition perceived by a user.

According to the method of the present invention, the equivalent temperature $T_{SET}$ tends to remain substantially constant and equal to the initial value $T_{SET\_0}$ up to a commutation instant t*, so that switching on the conditioning apparatus 10 does not alter the thermal condition perceived by the user. In other words, the method according to the invention neutralizes, or at least significantly limits, the disturbing effects of the environmental conditions (in particular the speed and temperature of the air in the room to be conditioned) because the conditioning apparatus 10 has been switched on, at least in an initial transitory step, so that the user maintains his sensation of comfort unchanged.

The method of regulating a conditioning apparatus 10 according to the invention determines the commutation instant t* which corresponds to a fan rotation speed at most equal to $V_{THRESHOLD}$ of the ventilation device 14, such that in the room to be conditioned there are specific values of air temperature and speed T*, v* which guarantee an equivalent temperature value $T_{SET}$ substantially equal, or in any case as near as possible, to the initial equivalent temperature value $T_{SET\_0}$ perceived by the user, calculated in correspondence to the switch-on instant t0. In other words, to determine the commutation instant t* at least the following equation must be satisfied:

$$T_{SET}=f(T^*,v^*,MRT,RH,clo,met) \cong T_{SET\_0}$$

As we said, some parameters in the above formula can be considered constant.

According to some embodiments, the step of calculating an initial equivalent temperature value perceived by a user $T_{SET\_0}$ comprises:
detecting a temperature of the air in the room T0 and a speed of the air in the room v0 at said switch-on instant t0;
calculating the initial equivalent temperature $T_{SET\_0}$ as a function of the temperature T0 and the speed v0 detected.

According to some embodiments, to determine the commutation instant t*, the method comprises the following steps:
memorizing information relating to the development over time of the variable quantities that affect the equivalent temperature $T_{SET}$ on which the conditioning apparatus 10 can act;
identifying at least one pair of values of air temperature and speed T*, v*, different from the temperature and speed values T0, v0 detected at the switch-on instant t0, which allow to obtain an equivalent temperature value $T_{SET}$ equal to the initial equivalent temperature value $T_{SET\_0}$ calculated at the instant t0;

since the parameters T*, v* are known, obtaining the commutation instant t* starting from the information memorized on the development over time of the temperature T and the air speed v.

According to some embodiments, the method obtains, from the speed value v* identified, a rotation speed value $V_{THRESHOLD}$ of the ventilation device 14 which will generate a speed of the air in the room equal to v*.

According to some embodiments, the step of memorizing information on the development over time of the variable quantities can introduce a plurality of speed values of the fan 15 into the apparatus 10 which define the development of the speed with respect to time, and/or a plurality of room temperature values T detected when the air conditioning apparatus 10 is switched on, so as to make the information regarding the development over time of the room temperature and the air speed in the room available when the apparatus is switched on.

According to some embodiments, the information relating to the development over time of the temperature and the speed are introduced into the conditioning apparatus 10 and memorized in the control and command unit 18 during the production step and/or the initial setting step of the conditioning apparatus 10.

According to variant embodiments, the information relating to the development over time of the temperature and speed are monitored and memorized continuously during the functioning of the conditioning apparatus 10, allowing a more precise modulation of the start-up step as a function of the characteristics of the conditioning apparatus 10.

Based on this information, therefore, and knowing a pair of temperature and speed values, it is possible to determine at what point in time they correspond, and consequently it is possible to obtain the commutation instant t*.

In embodiments where the heating device 12 comprises a PTC thermistor, the method according to the present invention provides that the commutation instant t* is subsequent to the instant in which the thermistor has reached its characteristic Curie temperature Tc.

In these embodiments, the commutation instant t* could be near to an instant in which the power absorbed by the heating device 12 stabilizes and is near to or equal to the nominal power value $P_{NOM}$ of the heating device (FIG. 3a).

For example, the nominal power value $P_{NOM}$ can be equal to about 1,400 Watts. In general, the nominal power value $P_{NOM}$ can be smaller, or greater, depending on the type and size of the conditioning apparatus 10. During use, when a user switches on the conditioning apparatus 10, in correspondence with a switch-on instant t0, the method according to the present invention provides that the control and command unit 18 activates the heating device 12 and/or the ventilation device 14.

According to some embodiments of the invention, the method activates the heating device 12 at the switch-on instant t0, and only afterward activates the ventilation device 14.

According to these embodiments, the commutation instant t* can coincide with the instant of activation of the ventilation device 14, which therefore, before this instant, is inactive with zero rotation speed.

According to other embodiments, the method according to the invention activates the heating device 12 and the ventilation device 14 substantially at the same time as the switch-on instant t0.

According to some embodiments, after the step of activating the heating device 12 and the ventilation device 14, the method comprises the step of driving the ventilation device 14 so that it rotates at a speed lower than said speed $V_{THRESHOLD}$, up to the commutation instant t*, determined by the method steps described above.

In other embodiments, the method according to the invention keeps the rotation speed of the ventilation device 14 equal to a substantially constant value lower than the threshold speed $V_{THRESHOLD}$, up to the commutation instant t*.

In other embodiments, the method according to the invention keeps the speed of the ventilation device 14 constant and equal to the threshold speed $V_{THRESHOLD}$, up to the commutation instant t*.

In other embodiments, the method according to the invention varies the rotation speed of the ventilation device 14 so that the speed increases over time, while still remaining below the threshold speed $V_{THRESHOLD}$. In particular embodiments, the method according to the invention selectively drives the ventilation device 14 so that its speed increases with different growth ramps, as a function of the temperature gradient existing in the room to be conditioned.

In some embodiments of the method according to the invention, in which the apparatus is functioning in heating mode, the speed $V_{THRESHOLD}$ can generate an air speed in the room lower than 0.5 m/s.

In some embodiments, the speed $V_{THRESHOLD}$ can generate, for example, an air speed in the room of less than 0.4 m/s, or less than 0.2 m/s, or possibly equal to about 0.1 m/s.

According to some embodiments, the speed $V_{THRESHOLD}$ can be equal to the minimum value at which the ventilation device 14 can be made to rotate, that is, the value below which the latter would stop.

According to some embodiments, the method according to the invention comprises the step of increasing the rotation speed of the ventilation device 14 after the commutation instant t*, as can be seen in FIG. 3b. In this step, the rotation speed of the ventilation device 14, which up to the commutation instant t* is equal to or lower than the speed $V_{THRESHOLD}$, reaches a value $V_{USER}$. The value $V_{USER}$ is a value that is a function of the settings introduced by the user in the user interface 20.

In embodiments where the heating device 12 comprises a PTC thermistor, the method according to the invention makes the ventilation device 14 to rotate at a speed lower than $V_{THRESHOLD}$, or even zero speed, until the power absorbed by the heating device 12 has stabilized and is already near to the nominal value $P_{NOM}$ provided in its normal operating state.

Thus, the regulation method according to the invention keeps the ventilation device 14 stationary, or makes the device rotate at a speed lower than or equal to $V_{THRESHOLD}$ until the heating device 12 has heated up sufficiently. In this way the flow rate of the air exiting in the initial step is zero, or negligible, and therefore the user perceives only slightly, or does not perceive at all, an unpleasant sensation caused by an insufficiently heated jet of air.

Thanks to the method according to the present invention, it is therefore possible to render minimal, or even zero, a difference $\Delta T_{SET}$ between the equivalent temperature value perceived by the user initially $T_{SET\_0}$ and the equivalent temperature value perceived by the user at the commutation instant t*, a difference value that is indicative of the alteration of the thermal condition perceived by the user in the transitory step that immediately follows the switching-on of the apparatus 10.

With reference to FIG. 3a, two examples of possible developments 100, 101 of the power absorbed by the heating device 12 (in particular, as we said, a PTC thermistor) as a function of time, can be seen.

With reference to FIG. 3b, it should be noted that the development of speed in known apparatuses, indicated by a line of dashes, is significantly different from the development of the rotation speed of the ventilation device 14 which was described previously in relation to the method according to the invention. As can be seen, in known apparatuses, the rotation speed reaches a value very near to the speed $V_{USER}$ well before the commutation instant t*, which means that the rotation speed of the ventilation device 14, and therefore the speed of the flow of air emitted, is at normal operating speed shortly after switching on, when the heating device 12 is still cold.

It should be noted that the curve showing the increase in the rotation speed of the ventilation device 14 in FIG. 3b is shown purely by way of example. Depending on the type of motor 16 and the way in which it controls the ventilation device 14, many other curves or ramps can naturally be provided, more or less inclined, representative of the increase in speed of the ventilation device 14 from the switch-on/commutation instant until the speed value $V_{USER}$ is reached.

With reference to FIG. 3c, it can be seen how, while in the state of the art the development of the air temperature (indicated with a line of dashes) increases substantially linearly starting from the switch-on instant t0, in the method according to the invention the development of the temperature of the air is substantially similar to that of the rotation speed of the ventilation device 14.

In particular, in the method according to the invention, the air temperature remains very low until near to the commutation instant t*. Subsequently, the temperature increases with a first gradient of growth up to an instant near to the instant in which the stabilization of the power absorbed by the heating device 12 takes place.

Furthermore, after this instant of stabilization of the power absorbed, the temperature increases further until it reaches a temperature set by the user by means of the user interface 20. For example, after the stabilization instant, the temperature can grow with a second gradient of growth, which is lower than the first gradient of growth.

It is clear that modifications and/or additions of steps can be made to the method to regulate a conditioning apparatus as described heretofore, without departing from the field and scope of the present invention.

It is also clear that, although the present invention has been described with reference to some specific examples, a person of skill in the art shall certainly be able to achieve many other equivalent forms of regulation method, having the characteristics as set forth in the claims and hence all coming within the field of protection defined thereby.

The invention claimed is:

1. A method for regulating an air conditioning apparatus, the air conditioning apparatus including thermal conditioning means and a ventilation device, the method comprising: switching on said conditioning apparatus at a switch-on instant, activating the thermal conditioning means and the ventilation device, using said ventilation device to generate a flow of air toward said thermal conditioning means in order to direct the flow of air toward a room to be conditioned, said method further comprising calculating an initial equivalent temperature value perceived by a user, the initial equivalent temperature value being representative of thermal conditions of the room that correspond to the switch-on instant, determining a commutation instant of the ventilation device, the commutation instant being subsequent to said switch-on instant, the commutation instant corresponding to when said ventilation device is made to rotate at a speed that is less than, or equal to, a threshold value of rotation speed, in order to minimize or reduce to zero a difference between said initial equivalent temperature value perceived by the user and a subsequent equivalent temperature value perceived by the user corresponding to said commutation instant of time, said difference being indicative of an alteration of the thermal conditions perceived by the user in a transitory step that follows the switch-on instant of said conditioning apparatus, and wherein at least one or more of the initial equivalent temperature value and the subsequent equivalent temperature value is calculated according to the following functional relation:

$$T_{SET}=f(T;v;MRT;RH;clo;met)$$

where:
T is a temperature of air in the room;
v is a speed of air in the room;
MRT is a mean radiant temperature;
RH is relative humidity;
clo is a coefficient that expresses a heat insulation value of an individual in the room; and
met is a coefficient that takes into account a level of activity of the individual.

2. The method as in claim 1, wherein from the switch-on instant until said commutation instant, maintaining said ventilation device stationary, or rotating said ventilation device at a speed lower than or equal to said threshold rotation speed.

3. The method as in claim 1, wherein calculating an initial equivalent temperature value perceived by a user comprises:
detecting a temperature of the air in the room and an air speed in the room in correspondence with said switch-on instant;
calculating said initial equivalent temperature perceived by a user as a function of said temperature and speed detected in correspondence with said switch-on instant.

4. The method as in claim 3, wherein determining said commutation instant comprises the steps of:
storing in a memory information relating to the development over time of the values of temperature and speed of the flow of air, as a function of which the equivalent temperature value is variable;
determining at least a pair of air temperature values and a pair of speed values among said values memorized, different from said temperature and speed detected, which allow to obtain an equivalent temperature value substantially equal to said initial equivalent temperature perceived by a user;
obtaining from said determinate speed the value of rotation speed of said ventilation device;
obtaining said commutation instant in correspondence with which said pair of values is obtained, determined as a function of said rotation speed value obtained and of said memorized information.

5. The method as in claim 1, including providing a material for the conditioning means having a known Curie temperature, and wherein said commutation instant follows an instant in which the material for the conditioning means reaches the known Curie temperature.

6. The method as in claim 1, wherein said commutation instant is substantially equal to an instant in which an amount of power absorbed by said thermal conditioning means stabilizes and is substantially equal to a nominal power value of said thermal conditioning means.

7. The method as in claim 1, wherein driving said ventilation device keeps said rotation speed of said ventilation device lower than said threshold value at least until said commutation instant.

8. The method as in claim 5, wherein said rotation speed generates a speed of the air in the room less than 0.5 m/sec.

9. The method as in claim 1, including providing said conditioning apparatus with a user interface, wherein receiving settings introduced by a user via said user interface, and after said commutation instant, increasing the speed of said ventilation device to a speed value which is a value that is a function of settings introduced by the user via a user interface.

10. The method as in claim 1, wherein activating said thermal conditioning means and said ventilation device activates said thermal conditioning means and said ventilation device simultaneously.

11. The method as in claim 1, wherein activating said thermal conditioning means and said ventilation device activates said thermal conditioning means in correspondence with said switch-on instant and said ventilation device in correspondence with said commutation instant after said switch-on instant.

* * * * *